US012775548B2

(12) United States Patent
Jin et al.

(10) Patent No.: US 12,775,548 B2
(45) **Date of Patent: *Oct. 27, 2026**

(54) STORAGE DEVICE

(71) Applicant: SAMSUNG ELECTRONICS CO., LTD., Suwon-si (KR)

(72) Inventors: Sanghwa Jin, Suwon-si (KR); Dongouk Moon, Suwon-si (KR); Minho Kim, Suwon-si (KR); Sooyoung Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,594

(22) Filed: Oct. 18, 2024

(65) Prior Publication Data

US 2025/0045201 A1 Feb. 6, 2025

Related U.S. Application Data

(63) Continuation of application No. 18/134,408, filed on Apr. 13, 2023, now Pat. No. 12,153,515.

(30) Foreign Application Priority Data

Jun. 10, 2022 (KR) ........................ 10-2022-0070743

(51) Int. Cl.
*G06F 12/00* (2006.01)
*G06F 12/02* (2006.01)
*G06F 13/16* (2006.01)

(52) U.S. Cl.
CPC ...... *G06F 12/0246* (2013.01); *G06F 12/0292* (2013.01); *G06F 13/1668* (2013.01)

(58) Field of Classification Search
CPC ............. G06F 12/0246; G06F 12/0292; G06F 13/1668; G06F 11/1008; G06F 11/1076; G06F 11/14; G06F 3/0638; H03M 7/30
See application file for complete search history.

(56) References Cited

U.S. PATENT DOCUMENTS 8,122,193 B2 2/2012 Song et al.
8,954,694 B2 2/2015 Tomlin et al.
11,099,769 B1 8/2021 Colgrove et al.
12,153,515 B2 * 11/2024 Jin .......................... G06F 3/061
(Continued)

FOREIGN PATENT DOCUMENTS

KR 10-2017-0050935 A 5/2017
KR 10-1948381 B1 2/2019
(Continued)

OTHER PUBLICATIONS

Communication dated Dec. 10, 2025, issued by the Korean Intellectual Property Office in Korean Patent Application No. 10-2022-0070743.

*Primary Examiner* — Shawn X Gu
(74) *Attorney, Agent, or Firm* — Sughrue Mion, PLLC

(57) ABSTRACT

A method includes generating mapping information in which, for each frame of plural frames stored in a storage component, one or more logical addresses is assigned to the frame and providing a batch read request to the storage component, to read all of the one or more logical addresses assigned to the frame by referring the mapping information.

19 Claims, 7 Drawing Sheets

| Frame | LBA |
|---|---|
| 1 | 1 ~ 2 |
| 2 | 3 ~ 5 |
| 3 | 6 |
| 4 | 7 ~ 13 |
| 5 | 14 ~ 16 |
| 6 | 17 ~ 20 |
| • • • | • • • |
| n | m |

(56) References Cited

U.S. PATENT DOCUMENTS

| | | | | |
|---|---|---|---|---|
| 2010/0241643 | A1* | 9/2010 | Toda | G06F 16/907 707/E17.014 |
| 2011/0066818 | A1* | 3/2011 | Yu | G06F 21/10 711/E12.001 |
| 2014/0101375 | A1 | 4/2014 | Thatcher et al. | |
| 2014/0215199 | A1* | 7/2014 | Ma | G06F 9/4406 713/2 |
| 2015/0169465 | A1 | 6/2015 | Slepon | |
| 2021/0064280 | A1* | 3/2021 | Gunda | G11B 27/005 |
| 2021/0136366 | A1 | 5/2021 | Muthiah | |
| 2022/0116660 | A1* | 4/2022 | Walker | H04N 19/44 |
| 2022/0309194 | A1 | 9/2022 | Muthiah | |

FOREIGN PATENT DOCUMENTS

| | | | |
|---|---|---|---|
| KR | 10-2020-0057397 | A | 5/2020 |
| KR | 10-2021-0039185 | A | 4/2021 |
| KR | 10-2022-0009523 | A | 1/2022 |

* cited by examiner

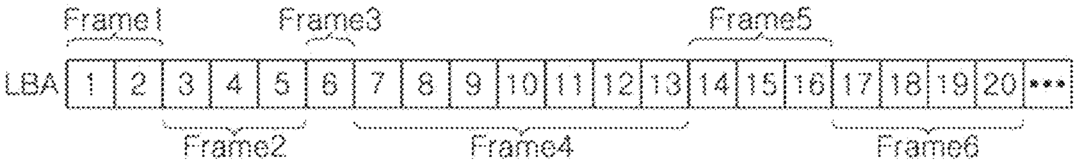
FIG. 7
| Frame | LBA |
|---|---|
| 1 | 1 ~ 2 |
| 2 | 3 ~ 5 |
| 3 | 6 |
| 4 | 7 ~ 13 |
| 5 | 14 ~ 16 |
| 6 | 17 ~ 20 |
| ••• | ••• |
| n | m |
FIG. 8
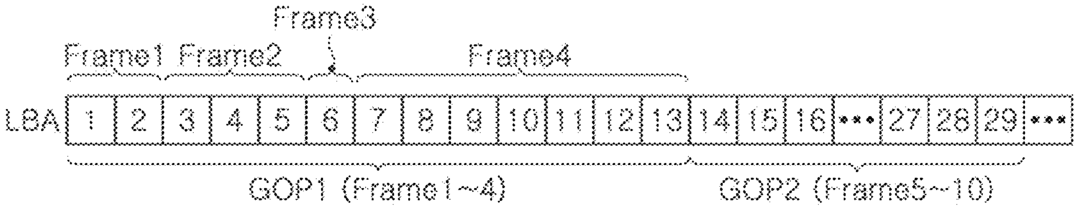
FIG. 9

| GOP | LBA |
|---|---|
| 1 | 1 ~ 13 |
| 2 | 14 ~ 29 |
| ● ● ● | ● ● ● |
| n | m |

FIG. 10

STORAGE DEVICE

CROSS-REFERENCE TO RELATED APPLICATIONS

This application is a Continuation Application of U.S. application Ser. No. 18/134,408 filed Apr. 13, 2023, which claims benefit of priority to Korean Patent Application No. 10-2022-0070743 filed on Jun. 10, 2022 in the Korean Intellectual Property Office, the disclosures of each of which being incorporated by reference herein in their entireties.

BACKGROUND

The present disclosure relates to a storage device.

Semiconductor memories are classified as volatile memory devices that lose stored data when a supply of power thereto is cut off, such as static random access memory (SRAM) and dynamic RAM (DRAM), and non-volatile memory devices that retain stored data even when a supply of power thereto is cut off, such as flash memory devices, phase-change RAM (PRAM), magnetic RAM (MRAM), resistive RAM (RRAM), ferroelectric RAM (FRAM), etc.

A storage device based on flash memory is used as a mass storage medium of a computing system. A storage device has a function of storing data under the control of a host device. Recently, in order to reduce a calculation burden of the host device, storage devices supporting various calculation operations or various applications in the storage devices have been developed.

SUMMARY

It is an aspect to provide a storage device that may read a data stream at a high speed from a memory device by using a mapping table in which logical addresses of a plurality of frames included in the data stream and a frame number assigned to each of the plurality of frames are mapped.

According to an aspect of one or more embodiments, a storage device may include a memory device that stores data; a storage controller that stores a data stream including a plurality of frames in the memory device based on a write request from a host; and a scaler that generates a mapping table in which, for each frame of the plurality of frames, at least one logical address assigned to the frame is mapped to a frame number assigned to the frame, wherein, for each frame of the plurality of frames included in the data stream, the scaler performs an operation of obtaining the at least one logical address assigned to the frame by referring to the mapping table and providing a batch read request to the storage controller to read all the at least one logical address assigned to the frame, wherein the storage controller controls the memory device to perform a read operation on a memory area corresponding to the at least one logical address based on the batch read request.

According to another aspect of one or more embodiments, a storage device may include a memory device that stores data; a storage controller that stores a data stream including a plurality of frame groups, in the memory device based on a write request from a host, each frame group including at least one frame; and a scaler that generates a mapping table in which, for each of the plurality of frame groups, at least one logical address assigned to the frame group is mapped to a frame group number assigned to the frame group, wherein, for each frame group of the plurality of frame groups included in the data stream, the scaler performs an operation of obtaining the at least one logical address for the frame group by referring to the mapping table and providing to the storage controller a batch read request to read all the at least one logical address assigned to the frame group, thereby to obtain each of the plurality of frame groups, encode the data stream using each of the plurality of frame groups, and provide a write request for the encoded data stream to the storage controller.

According to yet another aspect of one or more embodiments, a storage device may include a memory device that stores data; a storage controller that controls the memory device; and a processor that obtains data stored in the memory device, performs a calculation on the data, and stores the data on which the calculation has been performed in the memory device, wherein the processor generates a mapping table in which at least one logical address assigned to the data is mapped to an identifier assigned to the data, and transmits to the storage controller a batch read request to read all the at least one logical address assigned to the data by referring to the mapping table, to obtain the data stored in the memory device.

BRIEF DESCRIPTION OF DRAWINGS

The above and other aspects will be more clearly understood from the following detailed description, taken in conjunction with the accompanying drawings, in which:

FIG. 7 is a diagram schematically illustrating a data stream stored in a storage device according to some embodiments;

FIG. 8 is a diagram schematically illustrating a mapping table included in a storage device according to some embodiments;

FIG. 9 is a diagram schematically illustrating a data stream stored in a storage device according to some embodiments; and FIG. 10 is a diagram briefly illustrating a mapping table included in a storage device according to some embodiments.

DETAILED DESCRIPTION

Hereinafter, example embodiments will be described with reference to the accompanying drawings.

Figure 1:
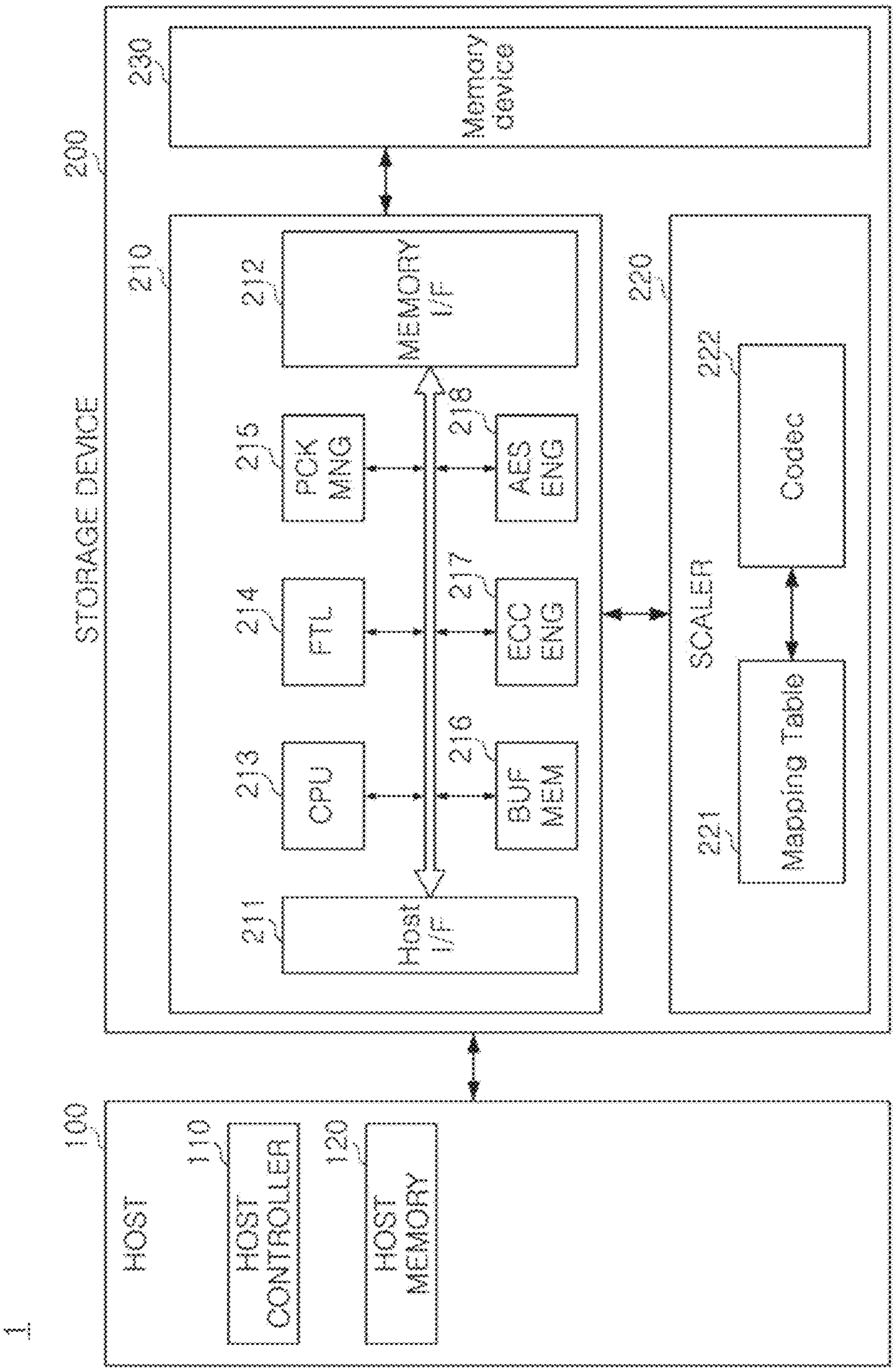
FIG. 1 is a diagram schematically illustrating a system including a storage device according to some embodiments.

FIG. 1 is a diagram schematically illustrating a system including a storage device according to some embodiments.

A system 1 including a storage device according to some embodiments may include a host 100 and a storage device 200. The host 100 may include a host controller 110 and a host memory 120, and the storage device 200 may include a storage controller 210, a scaler 220, and a memory device 230.

The host memory 120 may function as a buffer memory for temporarily storing data to be transmitted to the storage device 200 or data transmitted from the storage device 200.

The host controller 110 may manage an operation of storing data (e.g., write data) of a buffer area of the host memory 120 in the memory device 230, or storing data (e.g., read data) of the memory device 230 in the buffer area.

The storage device 200 may include storage mediums for storing data according to a request from the host 100. As an example, the storage device 200 may include at least one of a solid state drive (SSD), an embedded memory, and a removable external memory. When the storage device 200 is an SSD, the storage device 200 may be a device conforming to a non-volatile memory express (NVMe) standard. When the storage device 200 is an embedded memory or an external memory, the storage device 200 may be a universal flash storage (UFS) or a device conforming to an embedded multi-media card (eMMC) standard. The host 100 and the storage device 200 may respectively generate and transmit a packet according to an adopted standard protocol.

When the memory device 230 of the storage device 200 includes a flash memory, the flash memory may include a two dimensional (2D) NAND memory array or a three dimensional (3D) NAND memory array. As another example, the memory device 230 may include various other types of non-volatile memories. For example, the memory device 230 may include a magnetic RAM (MRAM), a spin-transfer torque MRAM, a conductive bridging RAM (CBRAM), a ferroelectric RAM (FeRAM), a phase-change RAM (PRAM), a resistive memory, and/or various other types of memory.

According to an embodiment, the host controller 110 and the host memory 120 may be implemented as separate semiconductor chips. In some embodiments, the host controller 110 and the host memory 120 may be integrated in the same semiconductor chip. As an example, the host controller 110 may be one of a plurality of modules included in the application processor, and the application processor may be implemented as a system on chip (SoC). In some embodiments, the host memory 110 may be an embedded memory provided in the application processor or a non-volatile memory or a memory module disposed outside the application processor.

The storage controller 210 may include a host interface (I/F) 211, a memory interface (I/F) 212, and a central processing unit (CPU) 213. In addition, the storage controller 210 may further include a flash translation layer (FTL) 214, a packet (PCK) manager (MNG) 215, a buffer (BUF) memory (MEM) 216, an error correction code (ECC) engine (ENG) 217, and an advanced encryption standard (AES) engine (ENG) 218, and the like. The storage controller 210 may further include a working memory into which the flash translation layer 214 is loaded, and a data write and read operation for the memory device 230 may be controlled by executing the flash translation layer 214 by the CPU 213.

The host interface (I/F) 211 may transmit and receive packets to and from the host 100. A packet transmitted from the host 100 to the host interface 211 may include a command or data to be written to the memory device 230, and a packet transmitted from the host interface 211 to the host 100 may include a response with respect to a command or data read from the memory device 230. The memory interface (I/F) 215 may transmit data to be written to the memory device 230 to the memory device 230 or receive data read from the memory device 230. The memory interface 212 may be implemented to comply with a standard protocol, such as toggle or open NAND flash interface (ONFI).

The flash translation layer (FTL) 214 may perform various functions, such as address mapping, wear-leveling, and/or garbage collection. The address mapping operation is an operation of changing a logical address received from the host 100 into a physical address used to actually store data in the memory device 230.

Wear-leveling is a technology for preventing excessive degradation of a specific block by ensuring that blocks in the memory device 230 are used uniformly, and may be implemented through a firmware technology balancing erase counts of physical blocks.

Garbage collection is a technology for securing usable capacity in a memory device by copying valid data of a block to a new block and then erasing an existing block.

The packet manager (PCK MNG) 215 may generate a packet according to a protocol of an interface negotiated with the host 100 or parse various types of information from a packet received from the host 100. The buffer memory (BUF MEM) 216 may temporarily store data to be written to or data to be read from the memory device 230. The buffer memory 216 may be provided in the storage controller 210, but may be disposed outside the storage controller 210.

The ECC engine (ENG) 217 may perform an error detection and correction function on read data read from the memory device 230. More specifically, the ECC engine 217 may generate parity bits for write data to be written to the memory device 230, and the generated parity bits may be stored in the memory device 230 together with the write data. When reading data from the memory device 230, the ECC engine 217 may correct an error in the read data using parity bits read from the memory device 230 together with the read data, and output error-corrected read data.

The AES engine (ENG) 218 may perform at least one of an encryption operation and a decryption operation on data input to the storage controller 210 using a symmetric key algorithm.

In order to reduce a calculation burden of the host, storage devices that support a calculation operation including a calculation unit in the storage device have been developed. For example, in some embodiments, the calculation unit may be a processor such as a microprocessor, microcontroller, or hardware calculation logic. In some embodiments, the process may include one or more processors. In some embodiments, the scaler 220, without depending on the control of the host 100, may function as the calculation unit that obtains data stored in the memory device 230 within the storage device 200 and performs operations, such as decoding and encoding, and may reduce a calculation burden of the host. For example, in some embodiments, the scaler 220 may be implemented as one or more processors configured to obtain data stored in the memory device 230 and to perform operations such as decoding and encoding, in order to reduce a calculation burden on the host.

The scaler 220 may transmit/receive data and/or commands to and from the storage controller 210 in order to decode or encode data stored in the memory device, and may generate a mapping table 221 based on the data received from the storage controller 210. At least one logical address may be assigned to data stored in the memory device 230. At least one logical address assigned to data and an identifier of data may be mapped in the mapping table 221. In other words, the identifier of the data may be mapped to at least one logical address assigned to the data, in the mapping table 221.

The scaler 220 may include a codec 222, and the codec 222 may decode and/or encode data. The scaler 220 may transmit a sequential read request to the storage controller 210 by referring to the mapping table 221 to decode and/or encode data stored in the memory device 230, and the storage controller 210 may read data from the memory device 230 in response to the sequential read request of 220.

According to some embodiments, when reading data stored in the memory device 230, the scaler 220 may transmit a sequential read request for at least one logical address to the storage controller 210 by referring to the mapping table 221 in which an identifier assigned to the data and at least one logical address are mapped. Accordingly, the storage controller 210 may control the memory device 230 to quickly read data for encoding, and as a result, a speed of decoding and/or encoding may be improved.

Figure 2:
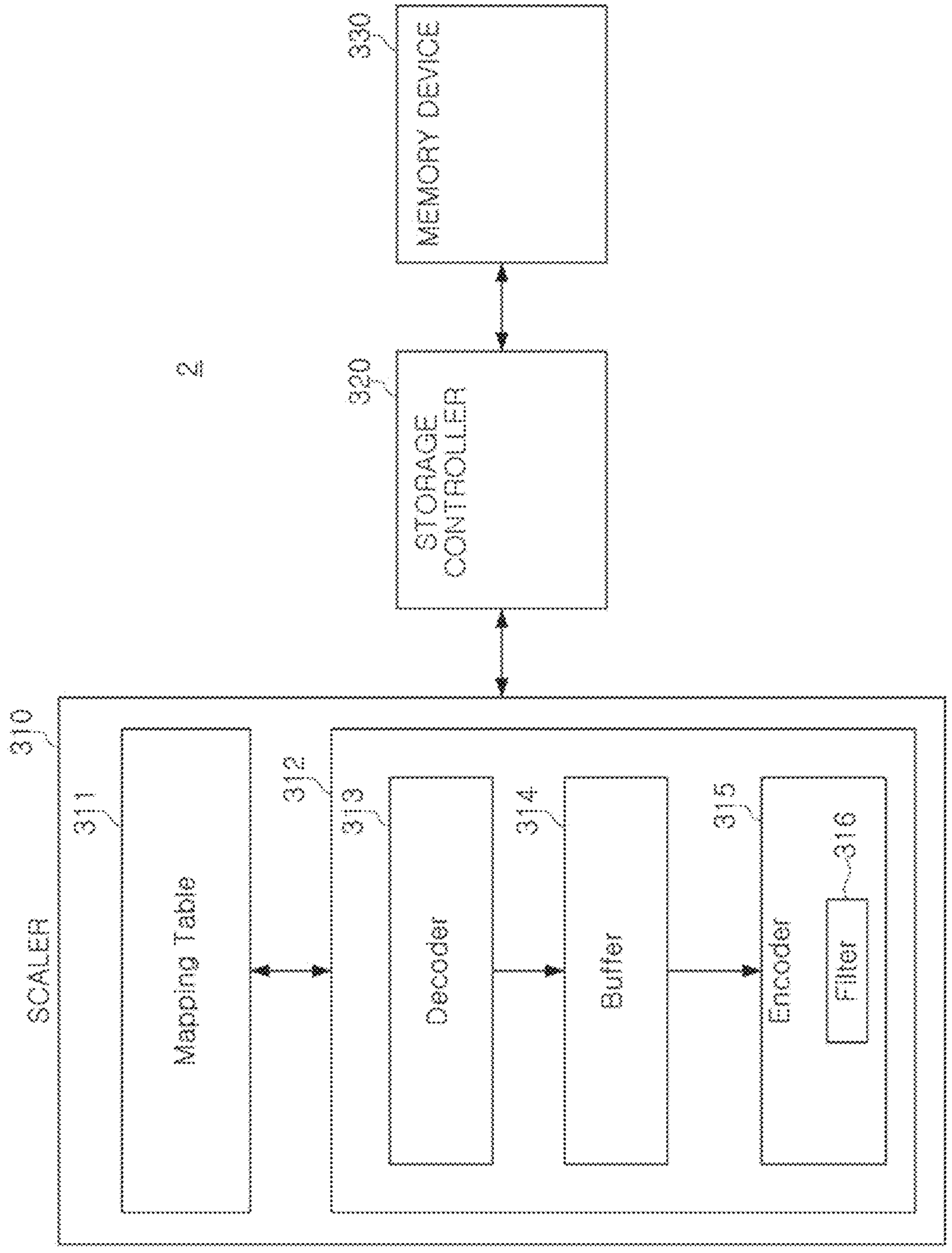
FIG. 2 is a diagram schematically illustrating a storage device according to some embodiments.

FIG. 2 is a diagram schematically illustrating a storage device according to some embodiments.

Referring to FIG. 2, a storage device 2 according to an example embodiment may include a scaler 310, a storage controller 320, and a memory device 330. The scaler 310, the storage controller 320, and the memory device 330 of FIG. 2 may correspond to the scaler 210, the storage controller 220, and the memory device 230 described above with reference to FIG. 1.

The scaler 310 may include a codec 312. The codec 312 may correspond to the codec 222 described above with reference to FIG. 1. The codec 312 may include a decoder 313, a buffer 314, and an encoder 315, and the encoder 315 may include a filter 316. The scaler 310 may transmit a sequential read request for data to the storage controller 320, and in response thereto, the storage controller 320 may obtain data from the memory device 330. The storage controller 320, having obtained the data from the memory device 330, may transmit the obtained data to the scaler 310.

For example, the data may be a data stream including a plurality of frames or a data stream including a plurality of frame groups, each frame group including at least one frame. For example, the data stream may be a media stream, such as a video stream or an audio stream, and according to an embodiment, the data stream may be managed in units of objects.

The scaler 310 may generate a mapping table 311 based on the data received from the storage controller 320. At least one logical address and identifier assigned to the data received from the storage controller 320 may be mapped in the mapping table 311. That is, the identifier assigned to the data may be mapped to the at least one logical address assigned to the data, in the mapping table 311. The identifier assigned to data may be an arbitrary value assigned by the scaler 310 to distinguish the corresponding data from other data. For example, when the data is a data stream including a plurality of frames, positive integer values may be assigned to each of the plurality of frames sequentially from 1 to n (see, e.g., FIG. 8 below) in order to identify the plurality of frames from one another.

The scaler 310 may perform encoding with reference to the mapping table 311. The scaler 310 may check at least one logical address assigned to data to be encoded by referring to the mapping table 311, and may transmit a sequential read request for the at least one logical address to the storage controller 320.

The sequential read request may refer to a read request for at least one consecutive logical address. In particular, when the storage controller 320 receives a sequential read request for a plurality of logical addresses from the scaler 310, the storage controller 320 may translate the plurality of logical addresses into physical addresses, schedule read commands for the physical addresses, and provide the scheduled read commands to the memory device 330. The storage controller 320 may quickly obtain data from the memory device 330 by scheduling the read commands for the plurality of physical addresses.

The storage controller 320 may read data stored in the memory device 330 based on the sequential read request from the scaler 310. The codec 312 included in the scaler 310 may perform a scaling operation including decoding, resizing, and encoding the data obtained from the memory device 330.

The decoder 313 may decode the data obtained from the memory device 330 to generate decoded data and may transmit the decoded data to the buffer 314. The buffer 314 may buffer/store the decoded data received from the decoder and transmit the data to the encoder 315.

The filter 316 included in the encoder 315 may resize the decoded data received from the buffer 314 to generate resized data. For example, the data may be one frame of a data stream including a plurality of frames, and the filter 316 may resize the data by changing resolution of the data. In some embodiments, the filter 316 may resize the data by changing a frame rate of the data.

As an example, the filter 316 may reduce at least one of a resolution and a frame rate of the decoded frame, when resizing the decoded frame. However, the method for resizing used by the filter 316 is not limited thereto, and may vary according to embodiments. For example, when the decoded frame is a color image, the filter 316 may convert the color image into a black-and-white image, and if the decoded frame is a 3D frame, the filter 316 may convert the 3D frame into a 2D frame.

The encoder 315 may encode the resized data to generate encoded data. The host may make a read request for data having a resolution, frame rate, and the like, different to that of original data initially stored in the memory device 330. In order to quickly provide the data having a resolution, frame rate, etc. different to that of the original data based on the read request from the host, the scaler 310 may perform decoding, resizing, and encoding operations on the original data, and transmit a write request for the encoded data to the storage controller 320.

That is, when the storage device 2 receives a write request for the original data from the host, the storage device 2 may not only store the original data in the memory device 330 but also generate various data having a different resolution or different frame rate from that of the original data using the scaler 310, and store the generated various data in the memory device 330. When the various data is stored in the memory device 330, the storage controller 320 may be able to access to the various data. In response to a read request from the host for the data having the resolution, frame rate, and the like, different from the original data, the storage controller 320 obtain the encoded data from the memory device 330, and transmit the encoded data to the host.

According to some embodiments, the scaler may obtain a data stream stored in the memory device by referring to the mapping table. However, embodiments do not exclude a situation in which the scaler obtains a data stream stored in the memory device without referring to the mapping table. For example, when the data stream stored in the memory device is initially encoded, the scaler may load the data stream into the buffer without a mapping table and may generate a mapping table by using the loaded data stream. In some embodiments, if the data stream having the different resolution, frame rate, etc., different from that of the original data is previously stored in the memory device, and a subsequent request for the same data is received from the host, the scaler may provide the encoded data without referring to the mapping table but by reading the previously encoded data from the memory device.

When the scaler refers to the mapping table, the scaler may obtain each frame more quickly than in a situation in which the scaler does not refer to the mapping table. Hereinafter, an example in which a frame is obtained without referring to a mapping table and an example in which a frame is obtained by referring to a mapping table will be described in comparison with reference to FIGS. 3 and 4.

Hereinafter, descriptions may be given with reference to FIGS. 3 and 4 in conjunction with FIG. 2.

Figure 3:
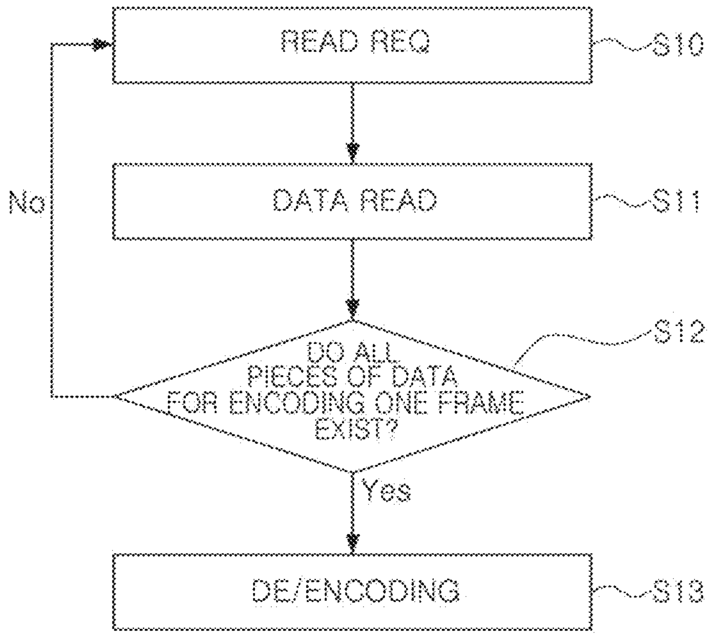
FIG. 3 is a diagram illustrating an operation of a storage device according to some embodiments.

FIG. 3 is a diagram illustrating an operation of a storage device according to some embodiments.

Referring to FIG. 3, in the storage device 2 according to some embodiments, the scaler 310 may make at least one read request READ REQ for data from the storage controller 320 for obtaining one frame among a plurality of frames included in the data stream.

At least one logical address may be assigned to each of the plurality of frames included in the data stream. In other words, each of the plurality of frames may have at least one assigned logical address. When the mapping table described above with reference to FIGS. 1 and 2 is not generated in the scaler 310, it may be difficult for the scaler 310 to know which at least one logical address is assigned to a given frame of the plurality of frames included in the data stream. Thus, the scaler 310 may transmit one read request to the storage controller 320 for one logical address of the at least one logical address for the frame one by one in order to encode the frame in operation S10.

The storage controller 320 may read data from the memory device 330 in response to the one read request for the one logical address received from the scaler 310 in operation S11. The storage controller 320 may transmit the data read from the memory device 330, to the scaler 310.

In operation S12, the scaler 310 may determine whether all pieces of data for encoding the one frame exist based on the data received from the storage controller 320.

When it is determined that all pieces of data for encoding the one frame exist (operation S12, Yes), the scaler 310 may perform decoding and encoding on the one frame in operation S13. When it is determined that all pieces of data for encoding the one frame do not exist (operation S12, No), the scaler 310 may transmit a next read request to the storage controller 320 for a next logical address of the at least one logical address of the one frame that is next to the logical address requested to be read immediately before, to encode the one frame.

When there is one logical address assigned to one frame, the scaler 310 may not transmit the next read request for the next logical address to the storage controller 320. However, when there are two or more logical addresses assigned to one frame, the scaler 310 may transmit the next read request for the next logical address to the storage controller 320 at least once to encode the frame.

According to the operation illustrated in FIG. 3, in order to encode the data stream including a plurality of frames, the operations S10-S13 are performed for each frame of the plurality of frames in the data stream.

Whenever each frame is encoded, the operation of determining whether all pieces of data for encoding a frame exist as in operation S13 may hinder the speed of encoding. For example, if there are N logical addresses assigned to a certain frame, the determining operation as in operation S13 may be performed N times for the frame (here, N is a positive integer). When there are K frames in the data stream, the determining operation in operation S13 may be performed N*K times for the data stream.

Figure 4:
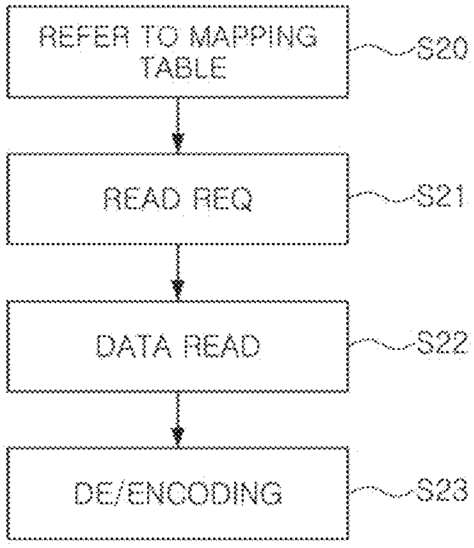
FIG. 4 is a diagram illustrating an operation of a storage device according to some embodiments.

FIG. 4 is a diagram illustrating an operation of a storage device according to some embodiments.

Referring to FIG. 4, the scaler 310 included in the storage device according to some embodiments may refer to a mapping table to encode data in operation S20. In this case, the data may be a data stream including a plurality of frames. Hereinafter, for convenience of description, it is assumed that data is a data stream including a plurality of frames. At least one logical address may be assigned to each of the plurality of frames included in the data stream. That is, each frame of the plurality of frames may have at least one assigned logical address.

As described above with reference to FIGS. 1 and 2, the scaler 310 may generate a mapping table. For each frame of the plurality of frames included in the data stream, at least one logical address assigned to the frame may be mapped to an identifier for the frame, in the mapping table. For example, the at least one logical address may be at least one logical block address (LBA), and frame numbers may be sequentially assigned to the plurality of frames as an identifier. That is, a first frame of the plurality of frames may be assigned a frame number 1, a second frame of the plurality of frames may be assigned a frame number 2, and so on.

The scaler 310 may refer to the mapping table in operation S20, and may know exactly the at least one logical address to be requested to encode each of the frames included in the data stream, and based thereon, the scaler 310 may request the storage controller to read the at least one logical address assigned to each of the plurality of frames frame by frame in operation S21. That is, the scaler 310 may request the storage controller to read the at least one logical address assigned to a first frame of the plurality of frames, and then the scaler 310 may request the storage controller to read the at least one logical address assigned to a second frame, and so on frame by frame. In other words, the scaler 310 may send a "batch" read request (i.e., a single read request per frame) to read all the at least one logical address assigned to a given frame.

In operation S22, the storage controller 320 may read data corresponding to the at least one logical address from the memory device 330 in response to the read request from the scaler 310, and transmit the read data to the scaler 310.

In operation S23, the scaler 310 may decode and/or encode data received from the storage controller 320.

According to some embodiments, the scaler 310 may quickly obtain a frame for encoding.

When a plurality of consecutive logical addresses are included in the sequential read request received by the storage controller 320, the storage controller 320 may quickly read the data by prefetching a memory area corresponding to a next logical address of a logical address corresponding to a memory area of the memory device 330 being currently accessed.

In other words, when the at least one logical address included in the sequential read request received from the scaler 310 is a plurality of logical addresses, the storage controller 320 may perform preliminary work to read data of the memory region corresponding to the next logical address, while reading the data of the memory area currently being accessed. After the storage controller 320 has read data from all of the at least one logical address, the storage controller 320 may transmit the data to the scaler 310. Alternatively, the storage controller 320 may transmit some of the data to the scaler 310 before all of the data is read.

Figure 5:
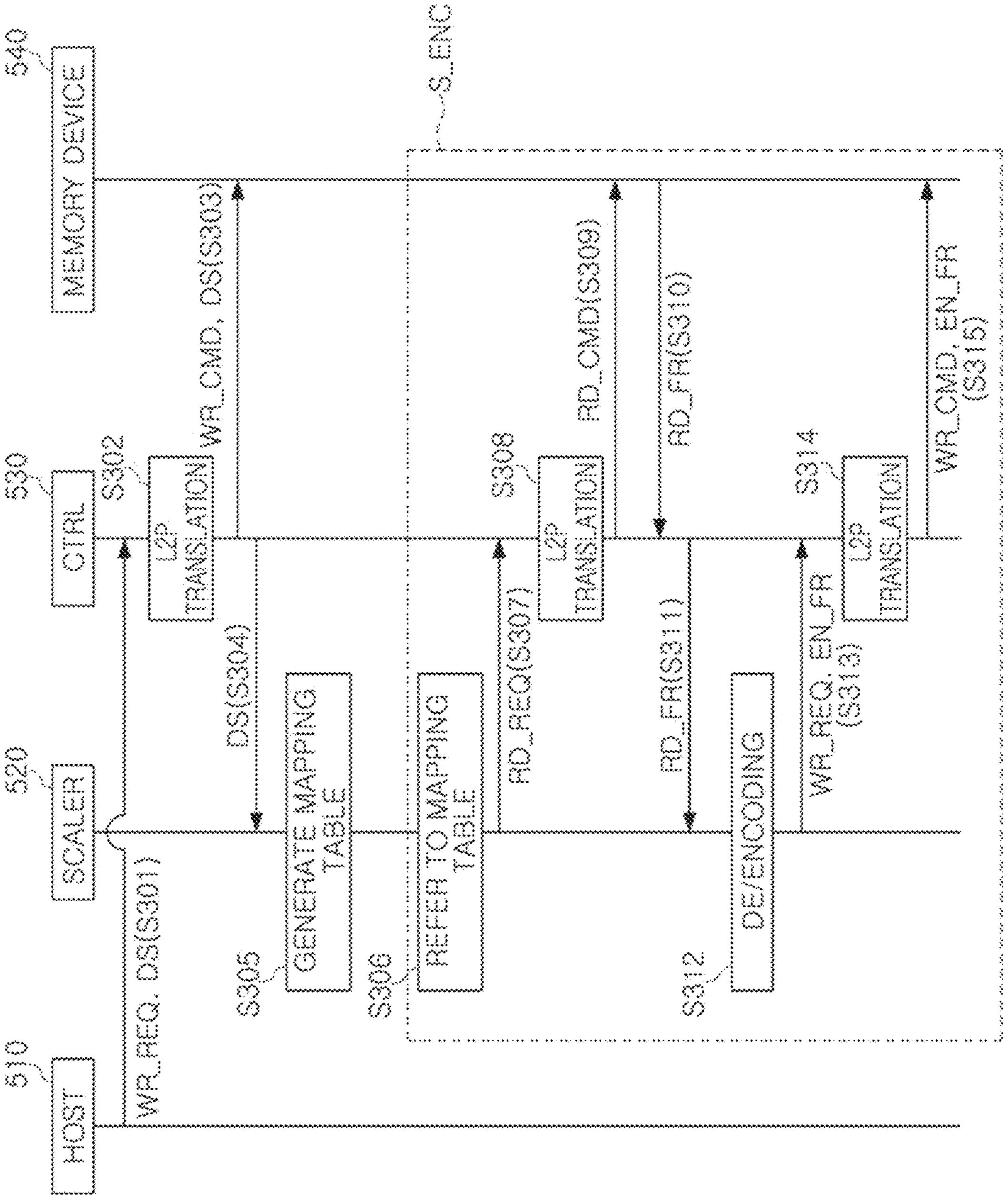
FIG. 5 is a diagram illustrating an operation of a storage device according to some embodiments.

FIG. 5 is a diagram illustrating an operation of a storage device according to some embodiments.

Referring to FIG. 5, in operation S301, a host 510 may transmit a write request WR_REQ for a data stream DS including a plurality of frames to a storage controller CTRL 530. As described above with reference to FIGS. 1 to 4, the data stream DS may be a data stream including a plurality of frames, or may be a data stream including a plurality of frame groups including at least one frame.

Hereinafter, for convenience of description, it is assumed that the data stream is a data stream including a plurality of frames.

In operation S302, in response to the write request WR_REQ from the host 510, a flash translation layer included in the storage controller 530 may perform logical to physical translation (L2P translation) and, for each frame of the plurality of frames, may translate at least one logical address assigned to the frame included in the data stream DS into at least one physical address at which the data will be actually stored in a memory device 540.

In operation S303, the storage controller 530 may transmit a write command for the data stream DS to the memory device 540 based on the at least one physical address translated in operation S302. The storage controller 530 may transmit the data stream DS to a scaler 520 in operation S304.

Upon receiving the data stream DS from the storage controller 530, the scaler 520 may assign an identifier, such as a frame number, to each frame of the plurality of frames included in the data stream DS and generate a mapping table in which, for each frame of the plurality of frames, at least one logical address is mapped to the frame number for the frame in operation S305.

When the scaler 520 that has generated the mapping table is in an idle state, an operation S_ENC may be initiated. In some embodiments, the operation S_ENC may be a scaler encoding operation. In the operation S_ENC, operations S306 to S315 may be performed for each frame of the plurality of frames included in the data stream DS, and the scaler may be in a busy state while operation S_ENC is performed for the plurality of frames. In other words, the scaler may be idle while not performing decoding and/or encoding operations, and may be busy while performing decoding and/or encoding operations. When operation S_ENC is completed for all frames included in the data stream DS, the scaler 520 that was in a busy state may return to an idle state.

When the scaler 520 that has generated the mapping table is in the idle state, the scaler 520 may accurately identify at least one logical address assigned for each of the plurality of frames by referring to the mapping table for encoding the data stream DS in operation S306. In other words, for each frame of the plurality of frames, the scaler 520 may accurately identify at least one logical address assigned to the frame, by referring to the mapping table The scaler 520 may refer to the mapping table and may transmit a read request for one frame of the plurality of frames included in the data stream DS to the storage controller 530 in operation S307.

Upon receiving the read request RD_REQ for the frame from the scaler 520, the storage controller 530 may perform logical to physical (L2P) translation to translate the at least one logical address assigned to the frame in operation S308 into at least one physical address at which data is to be actually stored in the memory device 540, and may transmit a read command RD_CMD for the frame to the memory device 540. In some embodiments, the read command RD_CMD may include the at least one physical address for the frame.

In operation S310, the storage controller 530 may obtain a frame RD_FR read from the memory device 540 based on the read command RD_CMD, and the storage controller 530 transmit the read frame RD_FR to the scaler 520 in operation S311.

The scaler 520 may receive the read frame RD_FR from the storage controller 530 and may decode the read frame RD_FR to generate a decoded frame in operation S312. For example, as described above with reference to FIG. 2, the scaler 520 may include a decoder, a filter, and an encoder, and decoding of the read frame RD_FR may be performed by the decoder in operation S312. The filter may resize the decoded frame to generate a resized frame, and the encoder may encode the resized frame to generate an encoded frame EN_FR.

When the encoded frame EN_FR is generated in operation S312, the scaler 520 may transmit a write request WR_REQ for the encoded frame EN_FR to the storage controller 530.

In response to the write request WR_REQ from the scaler 520, the storage controller 530 may perform L2P translation to translate the logical address of the encoded frame EN_FR into a physical address at which the encoded frame EN_FR is to be actually stored in the memory device 540 in operation S314, and the storage controller 530 may transmit a write command WR_CMD for the encoded frame EN_FR to the memory device 540 in operation S315. As described above, the operation S_ENC may be performed for each frame of the plurality of frames in the data stream DS to encode and write the data stream DS.

Figure 6:
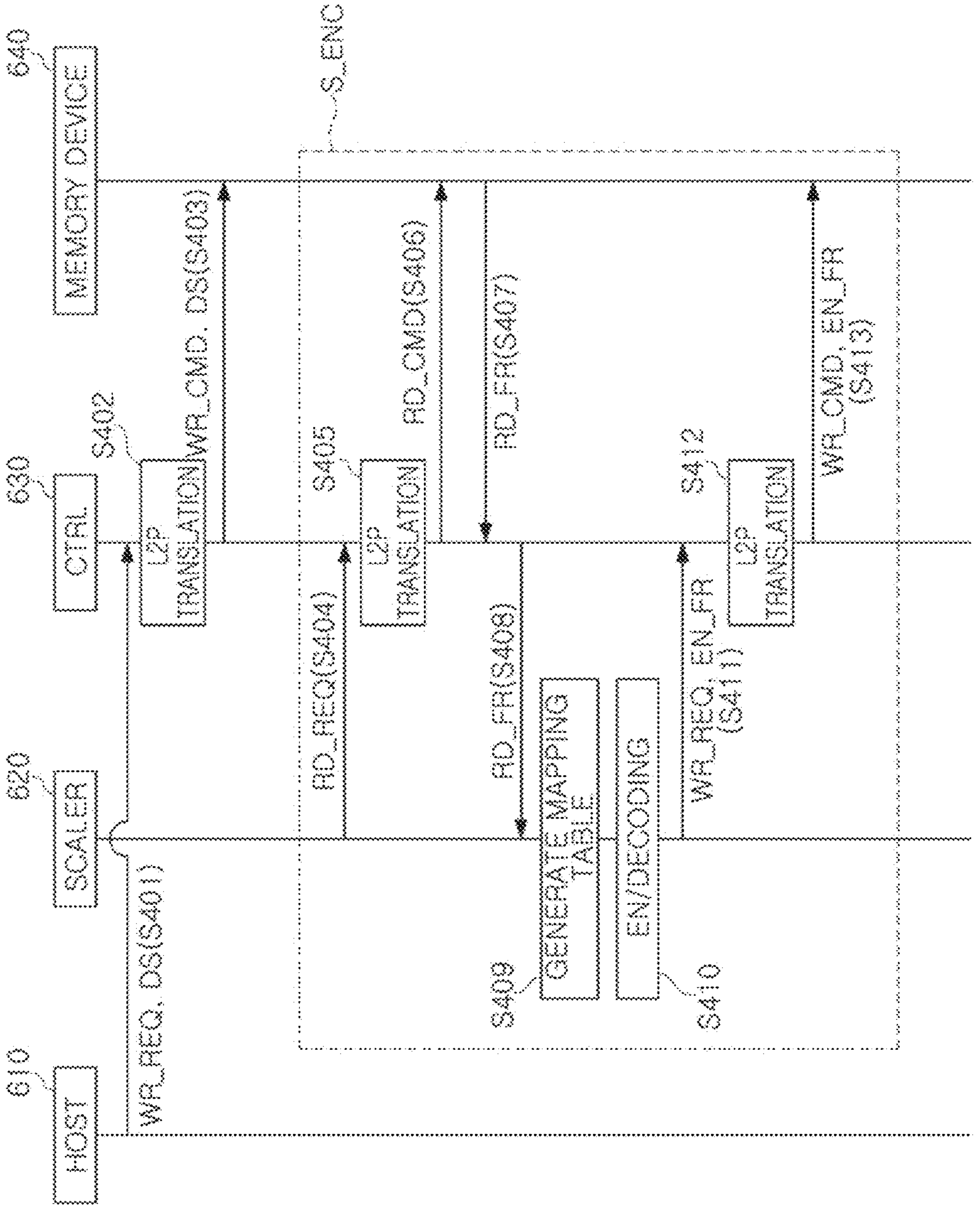
FIG. 6 is a diagram illustrating an operation of a storage device according to some embodiments.

FIG. 6 is a diagram illustrating an operation of a storage device according to some embodiments.

Operations S401 to S403 of FIG. 6 are similar to and may be understood with reference to operations S301 to S303 described above with reference to FIG. 5 and thus a repeated description thereof is omitted for conciseness.

In operation S_ENC, operations S306 to S315 may be performed for each frame of a plurality of frames included in the data stream DS. When operation S_ENS is performed on all frames included in the data stream DS, a scaler 620 that was in a busy state may return to an idle state.

Compared with the operation described with respect to FIG. 5, according to some embodiments illustrated in FIG. 6, a storage controller CTRL 630 may receive a write request for a data stream DS from a host 610 and may not transmit the data stream DS to a scaler 620. Accordingly, the mapping table may not be generated and thus, when the scaler 620 makes a read request for the data stream DS stored in the memory device 640 after operation S403, there may be no mapping table to refer to.

The scaler 620 may transmit a read request RD_REQ for one frame of the plurality of frames included in the data stream DS to the storage controller 630 in operation S404 when in the idle state. In response to the read request for the frame from the scaler 620, the storage controller 630 may translate at least one logical address assigned to the frame into at least one physical address at which data is to be actually stored in the memory device 640 in operation S405.

After translating the at least one logical address of the frame into the at least one physical address, the storage controller 630 may transmit a read command RD_CMD for the frame to the memory device 640 in operation S406, and the storage controller 630 may obtain a read frame RD_FR from the memory device 640 in operation S407.

The storage controller 630 may receive the frame RD_FR from the memory device 640 and may transmit the read frame RD_FR to the scaler 620 in operation S408. The scaler 620 may assign an identifier, such as a frame number, to the read frame RD_FR received from the storage controller 630, and may generate a mapping table in which the at least one logical address assigned to the read frame RD_FR is mapped with an identifier.

After operation S409, in operation S410, the scaler 620 may decode the read frame RD_FR to generate a decoded frame, resize the decoded frame to generate a resized frame, and encode the resized frame to generate an encoded frame EN_FR.

Operations S411 to S413 illustrated in FIG. 6 are similar to and may be understood with reference to operations S313 to S315 described above with reference to FIG. 5, and thus a repeated description thereof is omitted for conciseness.

The operation of the storage device according to some embodiments described above with reference to FIGS. 5 and 6 may be equally applied to a case in which a data stream includes a plurality of frame groups including at least one frame.

For example, in operation S312 illustrated in FIG. 5, the scaler 520 may receive the read frame group from the storage controller 530 and may decode the read frame group to generate a decoded frame group, resize the decoded frame group to generate a resized frame group, and encode the resized frame group to generate an encoded frame group.

FIG. 7 is a diagram schematically illustrating a data stream stored in a storage device according to some embodiments.

Referring to FIG. 7, a data stream stored in a storage device according to some embodiments may include a plurality of frames. For example, the data stream may include a first frame Frame1, a second frame Frame2, a third frame Frame3, and fourth frame Frame4, a fifth frame Frame5, and a sixth frame Frame6.

At least one logical address may be assigned to each frame of the plurality of frames, and for example, the at least one logical address may be at least one LBA. An identifier, such as a frame number, may be assigned to each of the plurality of frames.

Referring to FIG. 7, at least one LBA may be assigned to each of a plurality of frames to which a frame number is assigned. First and second LBAs LBA1 and LBA2 may be assigned to the first frame Frame1, third to fifth LBAs LBA3 to LBA5 may be assigned to the second frame Frame2, a sixth LBA LBA6 may be assigned to the third frame Frame3, seventh to thirteenth LBAs LBA7 to LBA13 may be assigned to the fourth frame Frame4, fourteenth to sixteenth LBAs LBA7 to LBA13 may be assigned to the fifth frame Frame5, and seventeenth to twenties LBAs LBA14 to LBA16 may be assigned to the sixth frame Frame6.

FIG. 8 is a diagram schematically illustrating a mapping table included in a storage device according to some embodiments.

For example, the mapping table illustrated in FIG. 8 may be a mapping table for a data stream including a plurality of frames described above with reference to FIG. 7. As described above, an identifier, such as a frame number, may be assigned to each of the plurality of frames.

In some embodiments, the mapping table illustrated in FIG. 8 may be generated when a data stream is initially stored in the memory device, as described above with reference to FIG. 5. In some embodiments, as described above with reference to FIG. 6, a mapping table may be generated when a data stream stored in the memory device is read.

The scaler included in the storage device may identify the LBA, which is a logical address assigned to each of the frames, by referring to the mapping table. Accordingly, the scaler may transmit a read request for the first and second LBAs LBA1 and LBA2 to the storage controller to encode the first frame Frame1, may transmit a read request for the third to fifth LBAs LBA3 to LBA5 to the storage controller to encode the second frame Frame2, may transmit a read request for the sixth LBA LBA6 to the storage controller to encode the third frame Frame3, may transmit a read request for the seventh to thirteenth LBAs LBA7 to LBA13 to the storage controller to encode the fourth frame Frame4, may transmit a read request for the fourteenth to sixteenth LBAs LBA14 to LBA16 to the storage controller to encode the fifth frame Frame5, and may transmit a read request for the seventeenth to twenties LBAs LBA17 to LBA20 to the storage controller to encode the sixth frame Frame6. Frame numbers 1-n may be assigned to the frames, where n is an integer, and the logical block addresses 1-m may be used for the plurality of frames, where m is an integer. In some embodiments, m may be equal to or greater than n.

FIG. 9 is a diagram schematically illustrating a data stream stored in a storage device according to some embodiments.

Referring to FIG. 9, a data stream stored in a storage device according to some embodiments may include a plurality of frame groups, each frame group including at least one frame.

At least one logical address may be assigned to each of the plurality of frame groups, and for example, the at least one logical address may be at least one LBA. An identifier, such as a frame group number, may be assigned to each of the plurality of frame groups.

According to an embodiment, each of the plurality of frame groups may include at least one of an intra frame (I frame), a bidirectional frame (B frame), and a predicted frame (P frame). The I frame may be a first frame of a frame group, and may be a frame including all pieces of data of one frame. The scaler may refer to the I frame of each of the plurality of frame groups when decoding a data stream.

The P frame, as a forward predicted frame, may be a frame including only data of a portion different from a frame positioned immediately before.

The B frame may be located between the I frame and the P frame, and may be a frame including data estimating movement between the two frames by referring to both a previously located frame and a next located frame.

A first frame group GOP1 may include first to fourth frames Frame1 to Frame4, and first to thirteenth LBAs LBA1 to LBA13 may be assigned to the first frame group. A second frame group GOP2 may include fifth to tenth frames Frame5 to Frame10, and fourteenth LBA to twenty-ninth LBA LBA14 to LBA29 may be assigned to the second frame group.

FIG. 10 is a diagram briefly illustrating a mapping table included in a storage device according to some embodiments.

For example, the mapping table illustrated in FIG. 10 may be a mapping table for a data stream including a plurality of frame groups described above with reference to FIG. 9. As described above, an identifier, such as a frame group number, may be assigned to each of the plurality of frame groups. Frame group numbers 1-n may be assigned to the frame groups, where n is an integer, and the logical block addresses 1-m may be used for the plurality of frame groups, where m is an integer. In some embodiments, m may be equal to or greater than n.

In some embodiments, the mapping table illustrated in FIG. 10 may be generated when a data stream is initially stored in a memory device, as described above with reference to FIG. 5. In some embodiments, the mapping table may be generated when a data stream stored in the memory device is read, as described above with reference to FIG. 6.

The scaler included in the storage device may identify the LBA(s), which is a logical address assigned to a frame group, by referring to the mapping table. Accordingly, the scaler may transmit a read request for first to thirteenth LBAs LBA1 to LBA13 to the storage controller to encode the first frame group GOP1, and may transmit a read request for fourteenth to twenty-ninth LBAs LBA14 to LBA29 to the storage controller to encode the second frame group GOP2.

According to some embodiments, when reading data stored in a memory device for encoding, a logical address to be requested for read from a storage controller to read the data may be accurately known by referring to a mapping table in which at least one logical address assigned to the data and an identifier are mapped. Accordingly, the data stored in the memory device may be read quickly, and decoding and/or encoding speed for the data may also be improved.

While example embodiments have been illustrated and described above, it will be apparent to those skilled in the art that modifications and variations could be made without departing from the scope of the present disclosure as defined by the appended claims.

What is claimed is:

1. A method comprising:

generating mapping information in which, for each frame of a plurality of frames stored in a storage component, at least one logical address is assigned to the frame, wherein numbers of the at least one logical address assigned to at least a portion of the plurality of frames are different from each other; and providing a batch read request to the storage component, to read all of the at least one logical address assigned to a frame by referring to the mapping information.

2. The method of claim 1, further comprising:

performing a scaling operation for each frame of the plurality of frames, the scaling operation including:

obtaining whole data included in the frame based on the batch read request, decoding the frame to generate a decoded frame, and resizing the decoded frame to generate a resized frame, encoding the resized frame to generate an encoded frame, and providing a write request to write the encoded frame to the storage component.

3. The method of claim 2, wherein resizing the decoded frame includes changing a resolution of the decoded frame.

4. The method of claim 2, wherein resizing the decoded frame includes changing a frame rate of the decoded frame.

5. The method of claim 2, wherein the batch read request is provided in an idle state in which the decoding and the encoding are not performed.

6. The method of claim 2, wherein the mapping information is generated when each frame of the plurality of frames is first encoded.

7. The method of claim 1, wherein generating the mapping information includes:

providing a read request to the storage component for one logical address, obtaining a piece of data corresponding to the one logical address from the storage component, determining whether all pieces of data for encoding the frame have been obtained, based on at least one piece of data obtained from the storage component, and generating mapping information of the frame, when all the pieces of data for encoding the frame have been obtained.

8. The method of claim 7, wherein generating the mapping information further includes:

providing a next read request to the storage component for a next logical address of the one logical address, when all the pieces of data for encoding the frame have not been obtained.

9. The method of claim 1, wherein the mapping information is generated when the plurality of frames is stored in the storage component.

10. The method of claim 1, wherein the at least one logical address is at least one logical block address (LBA).

11. The method of claim 1, wherein each of the plurality of frames includes at least one of an intra frame, a bidirectional frame or a predicted frame.

12. A system comprising:

a storage component configured to store image frames; and a processing component configured to obtain one image frame of the image frames from the storage component, the one image frame having a plurality of logical addresses assigned thereto, wherein the processing component provides a batch read request to the storage component to read all of the plurality of logical addresses assigned to the one image frame.

13. The system of claim 12, wherein the processing component resizes the obtained image frame.

14. The system of claim 13, wherein the processing component stores the resized image frame to the storage component.

15. The system of claim 12, wherein the processing component generates the batch read request by referring to a mapping table in which, for each image frame of the image frames, at least one logical address is assigned to the image frame.

16. The system of claim 15, wherein the mapping table includes, for each image frame of the image frames, a mapping of the at least one logical address to a frame number assigned to the image frame.

17. The system of claim 12, wherein the storage component performs a read operation on a memory area corresponding to at least one logical address in response to the batch read request.

18. A method, comprising:

providing a batch read request to a storage component that stores image frames, to read all of a plurality of logical addresses assigned to one image frame of the image frames;

obtaining the one image frame from the storage component;

resizing the obtained image frame; and storing the resized image frame to the storage component.

19. The method of claim 18, further comprising:

referring to a mapping table in which, for each image frame of the image frames, at least one logical address is assigned to the image frame.

* * * * *